United States Patent
Kurashina

Patent Number: 6,137,663
Date of Patent: *Oct. 24, 2000

[54] MAGNETIC HEAD AND METHOD FOR MAGNETIC RECORDING AND PLAYBACK

[75] Inventor: Seiji Kurashina, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/998,057

[22] Filed: Dec. 24, 1997

[30] Foreign Application Priority Data

Dec. 24, 1996 [JP] Japan ..... 8-342868

[51] Int. Cl.$^7$ ..... G11B 5/39
[52] U.S. Cl. ..... 360/327.32; 360/327.1
[58] Field of Search ..... 360/113, 327.1, 360/327.3, 327.22, 327.32

[56] References Cited

U.S. PATENT DOCUMENTS

| | | | |
|---|---|---|---|
| 5,461,526 | 10/1995 | Hamakawa et al. | 360/113 |
| 5,654,854 | 8/1997 | Mallary | 360/113 |
| 5,748,413 | 5/1998 | Lederman et al. | 360/113 |
| 5,761,010 | 6/1998 | Mimura | 360/113 |
| 5,808,843 | 9/1998 | Kobayashi et al. | 360/113 |

FOREIGN PATENT DOCUMENTS

| | | |
|---|---|---|
| 52-62417 | 5/1977 | Japan . |
| 62-40610 | 2/1987 | Japan . |
| 63-142510 | 6/1988 | Japan . |
| 5-135332 | 6/1993 | Japan . |
| 6-215333 | 8/1994 | Japan . |
| 6-274831 | 9/1994 | Japan . |
| 7-50007 | 2/1995 | Japan . |
| 7-129926 | 5/1995 | Japan . |
| 7-225926 | 8/1995 | Japan . |
| 7-302411 | 11/1995 | Japan . |
| 8-36714 | 2/1996 | Japan . |
| 8-111007 | 4/1996 | Japan . |
| 8-147638 | 6/1996 | Japan . |

*Primary Examiner*—William Klimowicz
*Attorney, Agent, or Firm*—Sughrue, Mion, Zinn, Macpeak & Seas, PLLC

[57] ABSTRACT

A magnetoresistive effect type magnetic head has a magnetoresistive effect (magnetoresistive effect film) and a soft adjacent layer (SAL) that is disposed in opposition to the magnetoresistive effect film via an intervening non-magnetic film, for the purpose of applying a transversal bias magnetic field to the magnetoresistive effect film, and also has an antiferromagnetic film which is disposed so as to be in contact with at least part of the magnetoresistive effect film, for the purpose of applying a longitudinal bias magnetic field to the magnetoresistive effect film. The surface area of the region over which the magnetoresistive effect film makes contact with the antiferromagnetic film is established so as to be greater than the surface area of the active region thereof which does not contact the antiferromagnetic film.

10 Claims, 6 Drawing Sheets

MAGNETIC HEAD AND METHOD FOR MAGNETIC RECORDING AND PLAYBACK

BACKGROUND OF THE INVENTION

1. Field of the Invention

The present invention relates to a magnetic head for the purpose of reading an information signal that has been recorded onto a magnetic recording medium or writing an information signal onto a magnetic recording medium, using a magnetoresistive effect, and also to a method of recording and playback which uses the above-noted magnetic head.

2. Description of Related Art

The use of a magnetoresistive effect type of reading transducer for the purpose detecting magnetic signal information that has been recorded onto a magnetic recording medium has been known in the past.

In the case of using this magnetoresistive effect type reading transducer as a magnetic head, in order to maintain linearity in the operating region, and in order both to achieve a single magnetic domain in the construction of a magnetoresistive film (hereinafter referred to as an MR film) and to suppress Barkhausen noise, it was known to be necessary in particular to apply two types of bias magnetic fields to the MR film.

For example, as disclosed in Japanese Unexamined Patent Publication (KOKAI) No. 52-062417, one method is to apply a magnetic field in a direction that is perpendicular to the easy magnetization axis of the MR film, this being known as transversal bias.

This transversal bias, for example as disclosed in Japanese Unexamined Patent Publication (KOKAI) No. 52-062417, is obtained from a soft magnetic film (hereinafter referred to a as soft adjacent layer or SAL) which is disposed on the MR film with an intervening a non-magnetic film.

Additionally, as disclosed in Japanese Unexamined Patent Publication (KOKAI) No. 62-40610, there is the application of a magnetic field that is horizontal with respect to the easy magnetization axis of the MR film, this being known as the longitudinal bias. This longitudinal bias is obtained by means of exchange coupling between the MR film and an antiferromagnetic film which is disposed so that the antiferromagnetic film makes contact with at least a part of the MR film.

However, in the case of forming patterning by etching the MR film and SAL, closure domains and magnetic anisotropy occur due to the shape thereof, causing Barkhausen jump and SAL reversal.

For example, in the case in which the MR film and the SAL shape is made long in the longitudinal bias direction, shape magnetic anisotropy increases the anisotropy in the longitudinal bias direction, thereby preventing saturation of the SAL in the transversal bias direction.

As a result, in the signal magnetic field from the medium as well there is a tendency for the SAL to exhibit reversal, this causing noise on the playback signal. In a different example, in the case in which the MR film and SAL shapes are made rectangular, a multiple magnetic domain structure occurs at the corners of this MR film, this causing Barkhausen jump.

Additionally, if the contact between the MR film and the antiferromagnetic film is insufficient, it is not possible to obtain sufficient exchange coupling, resulting in a multiple magnetic domain structure in the MR film, this causing Barkhausen jump.

In the Japanese Unexamined Patent Publication (KOKAI) No. 7-129926, there is discovery of technology that, in establishing the relationship between the thicknesses of the magnetoresistive film and the SAL and the saturation magnetization, solves the above-noted problem. However, even in this structure it is difficult to eliminate Barkhausen noise entirely.

In view of the above-described drawbacks in the prior art, an object of the present invention is to provide a magnetic head which is a magnetoresistive effect type reading transducer that improves on the above-noted problems, and which not only has magnetic stability, but also has superior playback characteristics.

SUMMARY OF THE INVENTION

To achieve the above-noted object, the present invention has the basic technical constitution as described below. Specifically, the first aspect of the present invention is a magnetoresistive effect type magnetic head that has a magnetoresistive effect (MR film) and a soft adjacent layer (SAL) that is disposed in opposition to the MR film via an intervening non-magnetic film, for the purpose of applying a transversal bias magnetic field to the MR film, and further has an antiferromagnetic film which is disposed so as to be in contact with at least part of the above-noted MR film, for the purpose of applying a longitudinal bias magnetic field to the above-noted MR film, the surface area of the region over which the MR film makes contact with the antiferromagnetic film being established so as to be greater than the surface area of the active region of said magnetoresistive effect film in which said magnetoresistive effect film does not contact said antiferromagnetic film.

And the second aspect of the present invention is a magnetic recording and playback method which, in performing either recording of or playback of an information signal to or from a magnetic recording medium, makes use of a magnetoresistive effect type magnetic head that has a magnetoresistive effect (MR film) and a soft adjacent layer (SAL) that is disposed in opposition to the MR film via an intervening non-magnetic film, for the purpose of applying a transversal bias magnetic field to the MR film, and further has an antiferromagnetic film which is disposed so as to be in contact with at least part of the above-noted MR film, for the purpose of applying a longitudinal bias magnetic field to the above-noted MR film, the surface area of the region over which the MR film makes contact with the antiferromagnetic film being established so as to be greater than the surface area of the active region of said magnetoresistive effect film in which said magnetoresistive effect film does not contact said antiferromagnetic film.

By using the above-described technical constitutions, in a magnetic head and magnetic recording and playback method according to the present invention in a magnetoresistive effect type magnetic head that has an MR film and a soft adjacent layer (SAL) that is disposed in opposition to the MR film via an intervening non-magnetic film, for the purpose of applying a transversal bias magnetic field to the MR film, and further has an antiferromagnetic film which is disposed so as to be in contact with at least part of the above-noted MR film, for the purpose of applying a longitudinal bias magnetic field to the above-noted MR film, by particularly establishing the disposition and shape of the above-noted MR film and antiferromagnetic film within a specific range, it is possible obtain a magnetic head and a magnetic recording and playback method that uses this magnetic head which exhibit magnetic stability and has superior playback characteristics.

More specifically, this either establishes the surface area of the region over which the MR film and the antiferromagnetic film make contact (hereinafter referred edge region) as being, for example, two or more times the surface area of the active region of said magnetoresistive effect film in which said magnetoresistive effect film does not contact said antiferromagnetic film, or establishes the shape of the four corners of the MR film smooth curves, and further establishes the SAL longitudinal bias direction dimension so as to be within, for example, eight times the active region longitudinal bias direction dimension.

BRIEF DESCRIPTION OF THE DRAWINGS

FIG. 3 (A) through FIG. 3 (C) are cross-sectional views which show examples of the configuration of magnetic heads according to the present invention.

FIG. 4 (A) and FIG. 4 (B) are cross-sectional views which show examples of the configuration of magnetic heads according to the present invention.

DETAILED DESCRIPTION OF THE PREFERRED EMBODIMENTS

Embodiments of a magnetic head and magnetic recording and playback method according to the present invention are described in detail below, with reference being made to the relevant accompanying drawings.

Figure 1:
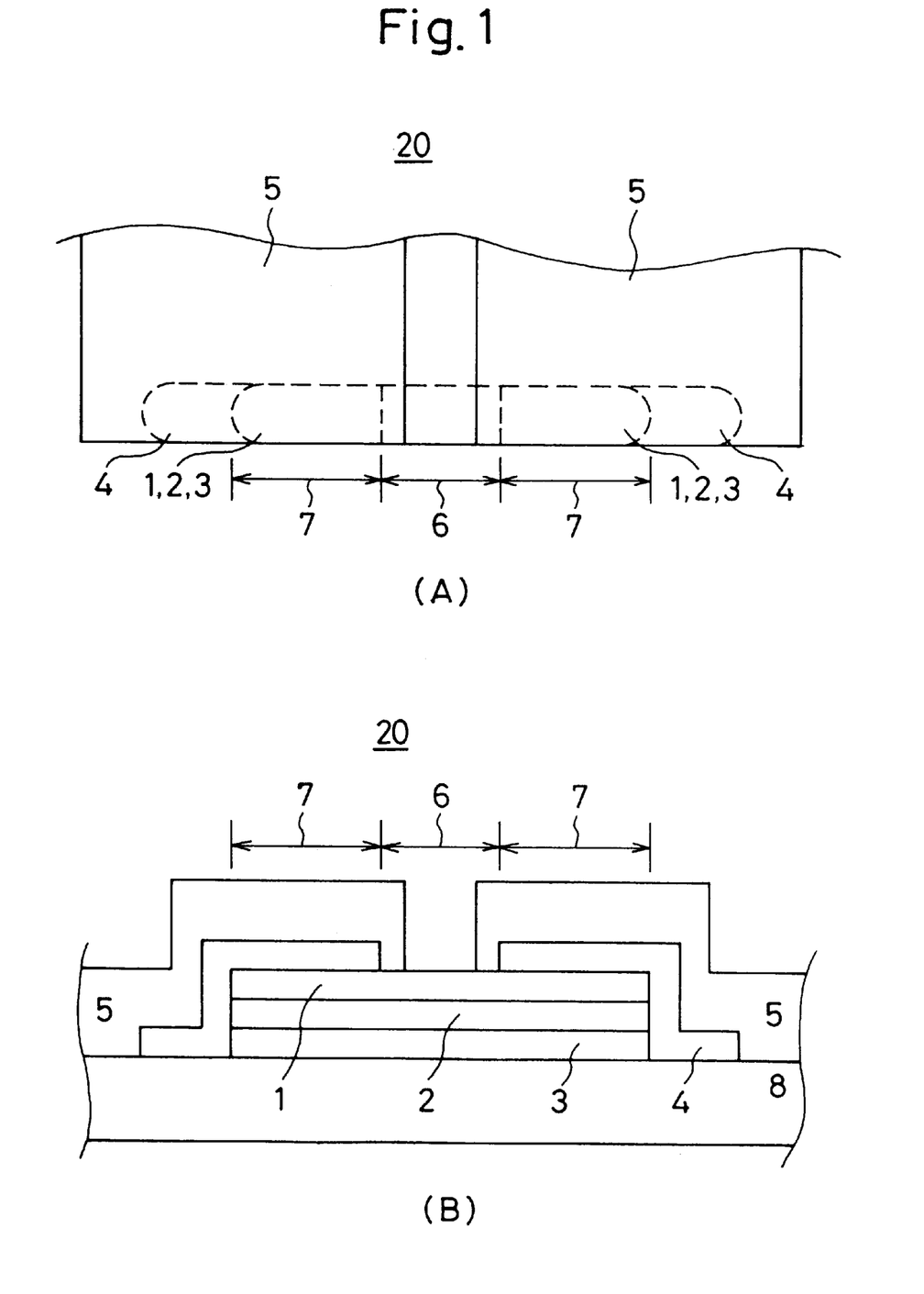
FIG. 1 is a drawing which illustrates the configuration of an example of a magnetoresistive effect type magnetic head according to the present invention, FIG. 1 (A) being a plan view thereof, and FIG. 1 (B) being a cross-sectional view thereof.

FIG. 1 is a simplified drawing which shows the configuration of an example of a magnetic head 20 that is a reading transducer according to the present invention, FIG. 1 (A) being a plan view of a part of the magnetic head 20, and FIG. 1 (B) being a cross-sectional view of the magnetic head 20 which is shown in FIG. 1 (A).

As can be seen clearly from FIG. 1 (A) and FIG. 1 (B), the magnetic head 20 is magnetoresistive effect type magnetic head having a magnetoresistive effect film (MR film) 1 and a soft adjacent layer (SAL) 3 that is disposed in opposition to the MR film 1 via an intervening non-magnetic film 2, for the purpose of applying a transversal bias magnetic field to the MR film 1, and further having an antiferromagnetic film 4 which is disposed so as to be in contact with at least part of the above-noted MR film 1, for the purpose of applying a longitudinal bias magnetic field to the MR film 1, the surface area of the region 7 over which the MR film 1 makes contact with the antiferromagnetic film 4 being established so as to be greater than the surface area of the active region 6 of said magnetoresistive effect film in which said magnetoresistive effect film does not contact said antiferromagnetic film 4.

Note that the substrate and the shield are not shown in the above-noted drawing.

Additionally, in the magnetic head 20 according to the present invention, it is desirable that the surface area 7 over which the magnetoresistive effect film 1 and antiferromagnetic film 4 make contact be established as being at least two times the surface area of the active region 6 in which the MR film does not make contact with the antiferromagnetic film 4.

That is, in the magnetic head 20 according to the present invention, by making the surface area of the edge region 7 over which contact is made between the MR film 1 and the antiferromagnetic film 4 larger than the surface area of the active region 6 at the center part of the MR 1, and preferably by making it at least two times the active region 6 at the center of the MR film 1, there are formed single magnetic domains in the MR film 1 even at the active region 6 at the center of the MR film 1, this enabling a suppression of Barkhausen jump.

The magnetic head 20 of the present invention having the constitution described above can be manufactured by applying the patterning technology of the past.

It is desirable to make the shape of the corner parts of the magnetoresistive effect film 1 of the present invention a linear curve or a curved surface, and by using this configuration it is possible to effectively prevent Barkhausen jump.

Figure 2:
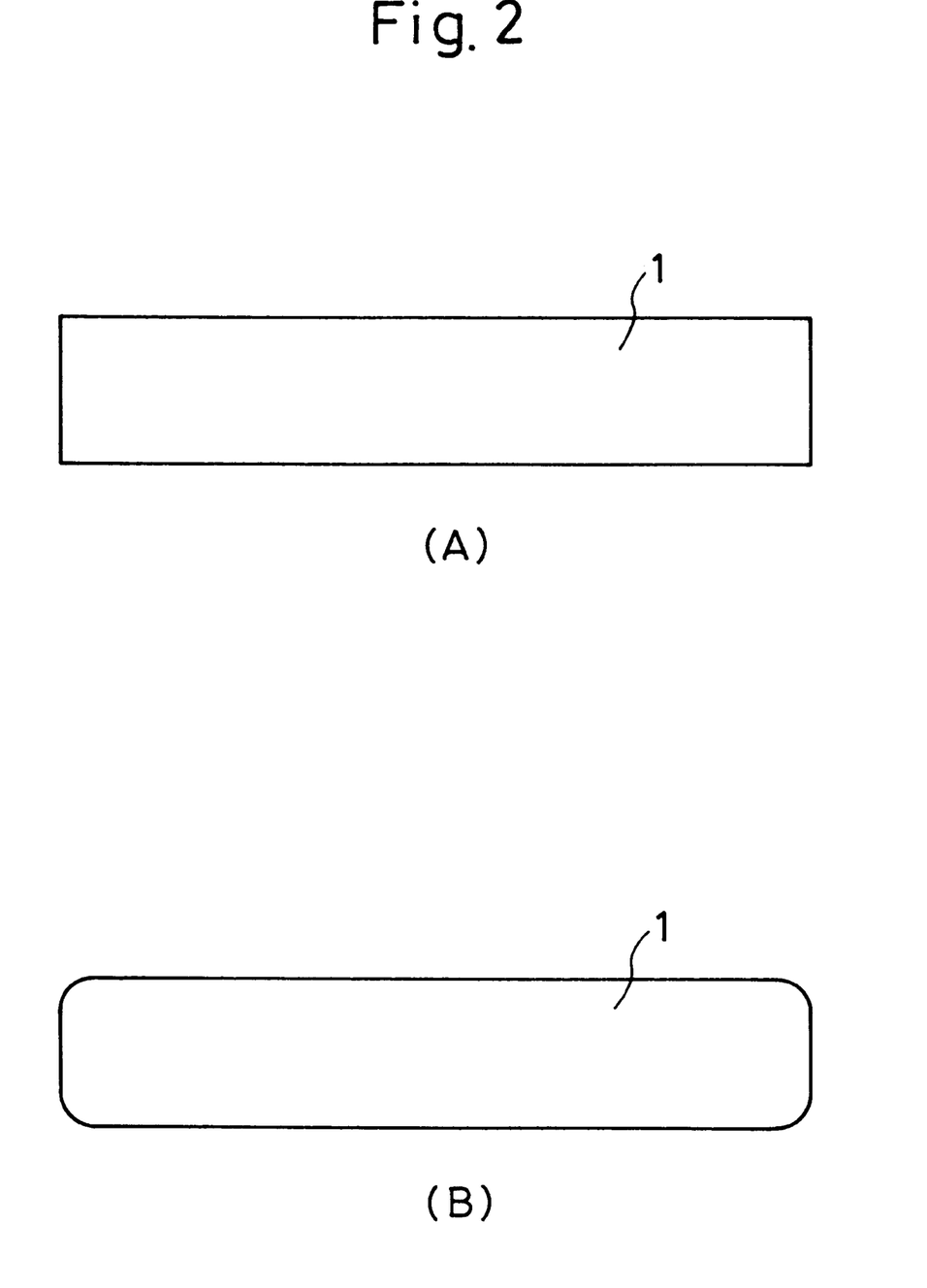
FIG. 2 is a plan view which shows the configuration of a magnetoresistive effect film, FIG. 2 (A) showing the shape of a magnetoresistive effect film of the past, and FIG. 2 (B) showing the shape of the magnetoresistive effect film that is used in the present invention.

As noted above, the shape of a magnetoresistive film (MR film) in the past, as shown in the plan view presented as FIG. 2 (A), had edges that were squared off, so that loop magnetic domains occurred at the corners because of a reduction in the static magnetic energy thereat. These loop magnetic domains are a cause of Barkhausen jump.

For this reason, in the present invention by making the shape of the four corners of the MR film 1 smooth curves such as shown in the plan view presented of the MR film 1 shown in FIG. 2 (B), because there is no tendency for loop magnetic domains to form as described above, single magnetic domain structure of the MR film 1 is maintained, and it is possible to suppress Barkhausen jump.

The construction of the corner part of the magnetoresistive effect film 1, when viewed from above or below is a smooth curves. However, when viewed in perspective it is desirable that it be a smooth curved surface.

As described above, it has been shown that, in the magnetic head 20 of the present invention, if the surface area of the edge region 7 over which contact is made between the MR film 1 and the antiferromagnetic film 4 is preferably made at least two times the surface area of the active region 6 at the center of this MR film 1, it is possible to suppress Barkhausen jump.

Therefore, if the longitudinal bias direction is made the longitudinal direction, as illustrated by the shape of the MR film 1, the MR film has single magnetic domains, and it is possible to suppress Barkhausen jump. In general, because the patterning of MR film 1 is done simultaneously with the patterning of the non-magnetic film 2 and the soft magnetic film (SAL) 3 which is disposed so as to be in opposition thereto via this intervening non-magnetic film, the SAL 3 is made the same shape as the MR film 1.

However, if the shape of the SAL 3 is made excessively long in the longitudinal bias direction, shape magnetic anisotropy will cause the anisotropy of the SAL 3 to be strong in the longitudinal bias direction, so that there is a tendency toward reversal of the SAL 3 and a worsening of the reading characteristics.

To solve the above-noted problem, therefore, it is desirable that the longitudinal bias direction dimension of the SAL 3 be established, for example, within a given prescribed range in relationship to the longitudinal bias direction dimension of the active region 6 and in the present invention, from the results of past experimentation, the conclusion was reached that, by making the longitudinal bias direction dimension of the SAL 3 within eight times the longitudinal bias direction dimension of the active region 6, it becomes possible to prevent a decrease in the magnitude of the magnetic field at which the SAL 3 reverses, this representing a favorable result.

The configuration of the magnetic head 20 according to the present invention will now be described in further detail.

As is clear from FIG. 1 (A) and FIG. 1 (B), in the magnetic head 20 according to the present invention, for example on top of a magnetoresistive effect (MR) film 1 made of a Ni-Fe alloy an antiferromagnetic film 4 made of a Fe-Mn, Ni-Mn or other such alloy formed so as to be making contact therewith and so as to be separated by a prescribed interval 6, thereby achieving a prescribed reading width.

Figure 5:
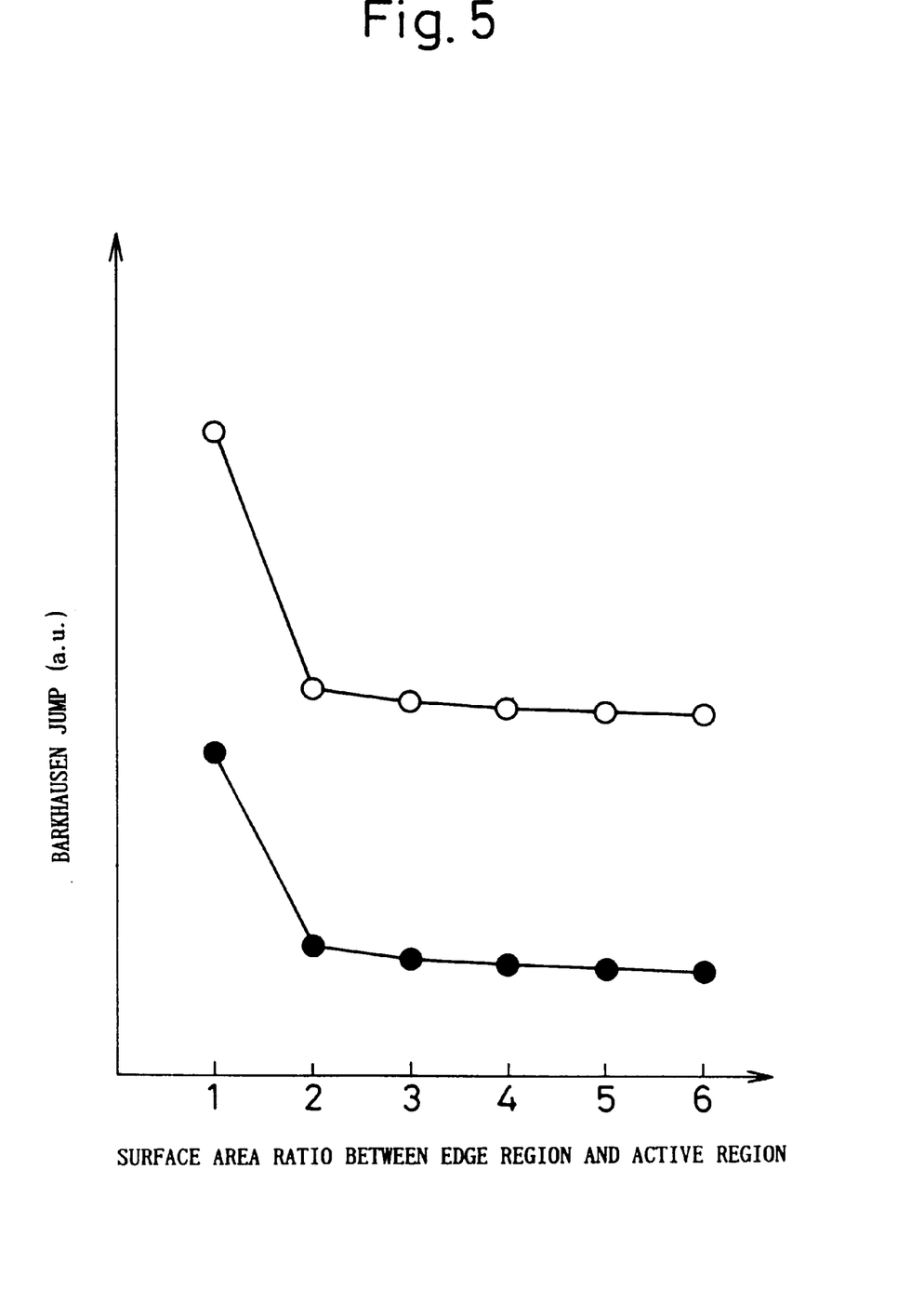
FIG. 5 is a graph which shows the relationship between the ratio of the surface area over which the MR film and the antiferromagnetic film are in contact to the active surface area and the Barkhausen jump.

The results of a study of the effect on the Barkhausen jump of the relationship of the surface area of the edge region 7 of the MR film 1 over which contact is made between the MR film 1 and the ferromagnetic film 4 with respect to the surface area of the active region 6 at the center part over which the MR film 1 and antiferromagnetic film 4 do not make contact are shown in the graph of FIG. 5.

FIG. 5 is a graph which shows the relationship between the value obtained by dividing the surface area of the active region 6 by the surface area of the edge region 7 in the magnetic head 20 and the Barkhausen jump, this indicating the dependency of the Barkhausen jump on the above-noted surface area ratio. In FIG. 5, the white circles represent the case in which the MR film 1 used had its four corners squared off as in the past, while the black dots represent the case of an MR film 1 in which the four corners are shaped as smooth curves, such as shown in FIG. 2 (B).

As can be seen from FIG. 5, in the case in which the four corners of the MR film 1 are squared off, there is an overall larger Barkhausen jump, compared to the case in which the corners are smooth curves.

That is, in the case in which the four corners of the MR film 1 are square, because the static magnetic energy is reduced at these corners, a multiple magnetic domain structure occurs, so that there is an increase in the Barkhausen jump. When the four corners of the MR film 1 are smooth curves, however, by preventing a reduction in the static magnetic energy and the formation of loop magnetic domains, this resulting in a single magnetic domain structure, thereby suppressing Barkhausen jump.

Additionally, as can be understood from FIG. 5, if the surface area of the edge region 7, over which contact is made between the MR film 1 and the antiferromagnetic film 4, is established so as to be at least two times the surface area of the active region 6 at the center part of the MR film 1, it is possible to suppress the Barkhausen jump.

Therefore, it is desirable to make the shape of the MR film 1 long in the longitudinal bias direction, and to make the surface area of the edge region 7 large.

In general, when because the patterning of MR film 1 is done simultaneously with the patterning of the non-magnetic film 2 which serves as magnetic separation film and the soft magnetic film (SAL) 3, the non-magnetic film 2 and the SAL 3 are made the same shape as the MR film 1. However, as described above, the shape of the MR 1 is made excessively long in the longitudinal bias direction, the shape of the SAL 3 is the same, the result being that the magnetic shape anisotropy of the SAL 3 results in an increase in the anisotropy in the longitudinal bias direction.

If the longitudinal bias direction anisotropy of the SAL 3 becomes large, there is reversal in the SAL 3 even in the signal magnetic field from the medium.

Figure 6:
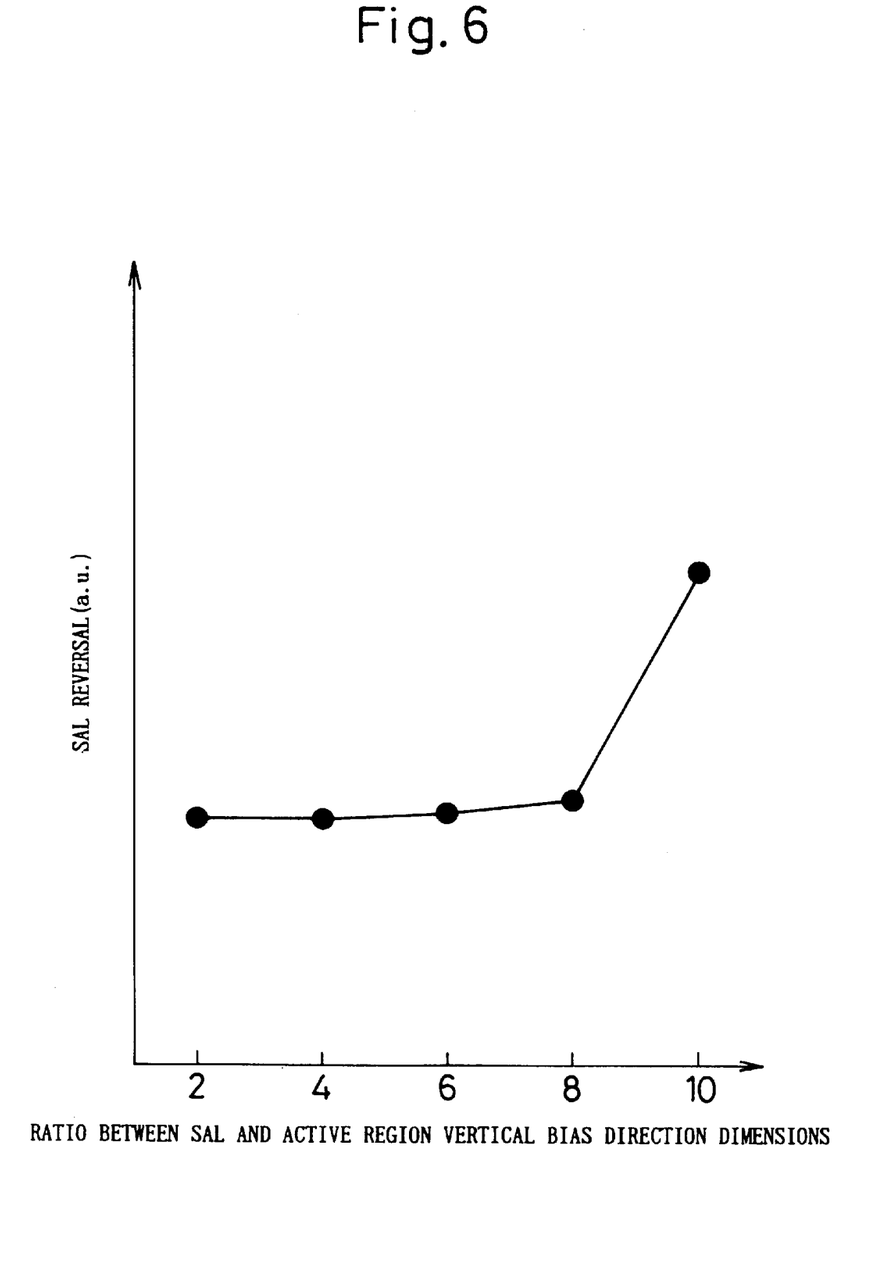
FIG. 6 is a graph which shows the relationship of between SAL reversal and the ration of the SAL longitudinal bias direction dimension to the active region longitudinal bias direction dimension.

Experimentation was done to study the relationship between the reversal in the SAL 3 and the length of the SAL 3 and the active region in the longitudinal bias direction to solve the above-noted problem in the present invention, the results thereof being shown in FIG. 6.

As can be seen from FIG. 6, by making the longitudinal bias direction dimension 9 of the SAL 3 within eight times the longitudinal bias direction dimension of the active region 6 of the MR film 1, it is possible to reduce the longitudinal bias direction anisotropy due to the shape magnetic anisotropy of the SAL 3, thereby enabling suppression of reversal in the SAL 3.

Therefore, in the magnetic head 20 according to the present invention, it is desirable to establish the longitudinal bias direction dimension of the soft magnetic film (SAL) 3 so as to be within eight times the longitudinal bias direction dimension of the active region 6.

Next, examples of the configuration of the magnetic head 20 according to the present invention will be described, with reference being made to FIG. 3 and FIG. 4.

Figure 3:
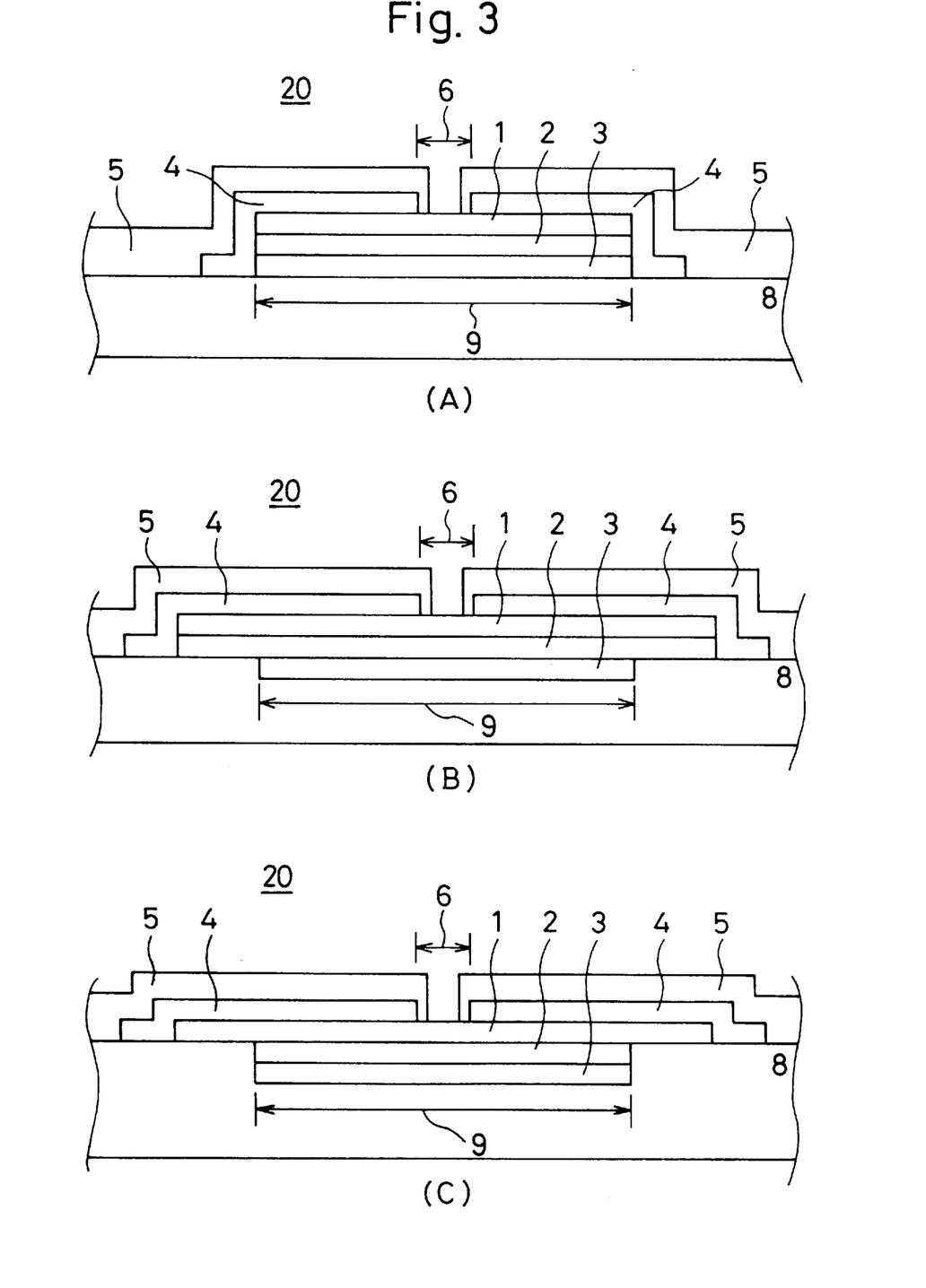
Figure 4:
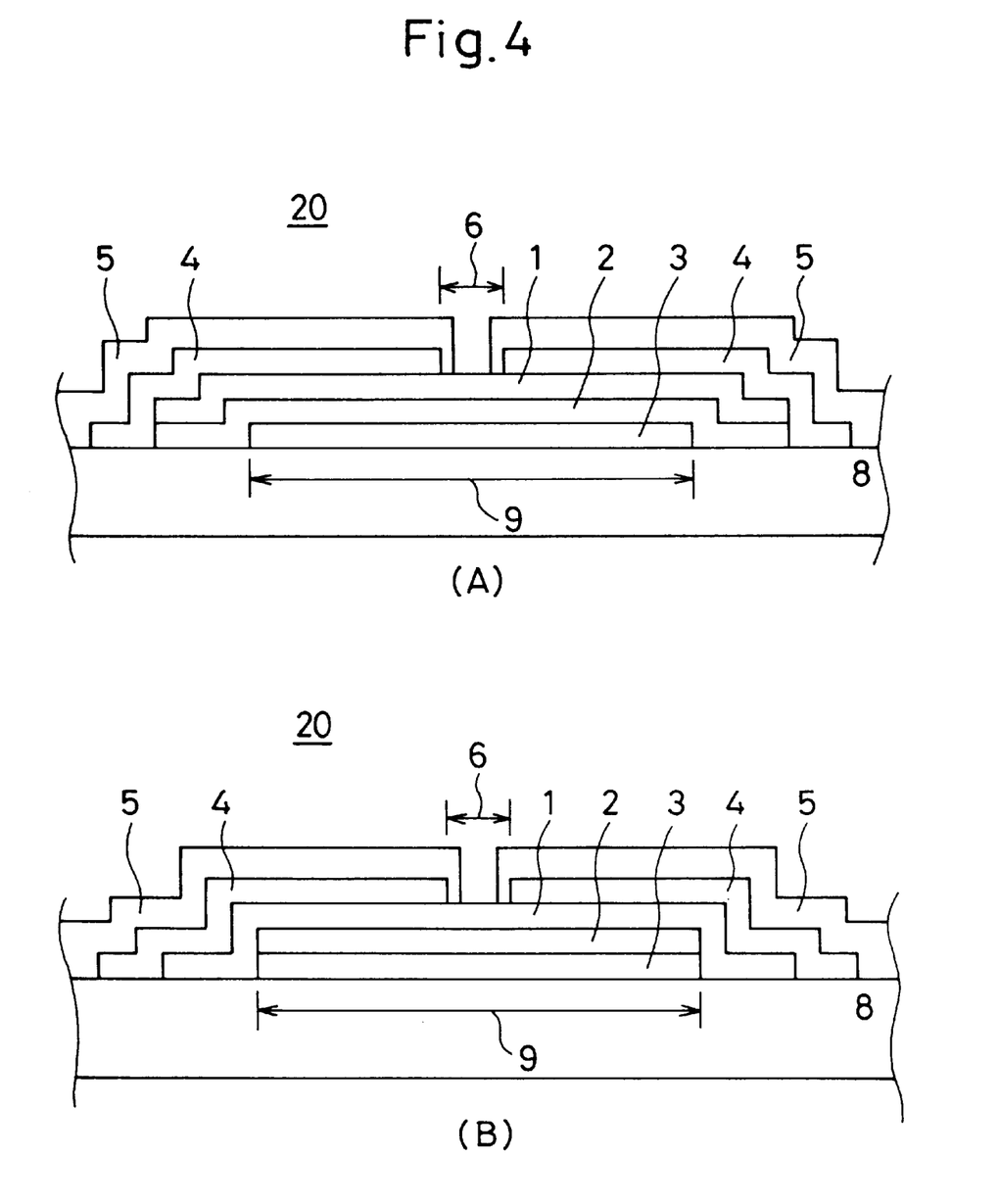

FIG. 3 and FIG. 4 are simplified views of magnetic heads 20 according to the present invention, in which consideration is given to the longitudinal bias direction dimension 9 of the SAL 3. FIG. 3 (A) shows the case in which the longitudinal bias direction dimensions of the MR film 1, the non-magnetic film 2, and the SAL 3 are established so as to be within eight times the longitudinal bias direction dimension of the active region 6 of the MR film 1.

FIG. 3 (B) shows the case in which the surface area over which there is contact between the MR film 1 and the antiferromagnetic film 4 is further sufficiently increased, and also in which the longitudinal bias direction dimension 9 of the SAL 3 is established so as to be within eight times the longitudinal bias direction dimension of the active region 6 of the MR film 1.

FIG. 3 (C) shows the case in which the longitudinal bias direction dimension of the non-magnetic film 2 is established in the same manner as is that of the SAL 3. In a case such as that shown in FIG. 3 (C), the effect with respect to both Barkhausen jump and SAL 3 reversal is equivalent to the case which is shown in FIG. 3 (B).

In the cases shown in FIG. 3 (B) and FIG. 3 (C), it is necessary to bury the SAL 3 in a lower insulating film 8. Simplifying this process, as shown in FIG. 4 (A) or FIG. 4 (B), patterning is done without of burying the SAL 3 (or non-magnetic film 2 and the SAL 3) in the lower insulating layer 8, after which the MR film 1 is patterned.

By doing this, although there is a step that is formed in the MR film 1 by the edge of the SAL 3 (or the non-magnetic film 2 and the SAL 3), because there is sufficient contact between the antiferromagnetic film 4 and the MR film 1, this does not have a great influence.

A magnetic recording and playback method according to the present invention is one which, in performing either recording of or playback of an information signal to or from a magnetic recording medium, makes use of a magnetoresistive effect type magnetic head that has a magnetoresistive effect (MR film) and a soft adjacent layer (SAL) that is disposed in opposition to the MR film via an intervening non-magnetic film, for the purpose of applying a transversal bias magnetic field to the MR film, and further has an antiferromagnetic film which is disposed so as to be in contact with at least part of the above-noted MR film, for the purpose of applying a longitudinal bias magnetic field to the above-noted MR film, the surface area of the region over which the MR film makes contact with the antiferromagnetic film being established so as to be greater than the surface area of the active region of said magnetoresistive effect film in which said magnetoresistive effect film does not contact said antiferromagnetic film.

In the recording and playback method according to the present invention, it is possible to achieve improve precision of writing information to and reading information from a magnetic recording medium.

By virtue of the above-described configuration, a magnetic head according to the present invention, which is a magnetoresistive effect type of reading transducer, improves on the drawbacks of the prior art as described above, and in particular has magnetic stability and superior playback characteristics.

What is claimed is:

1. A magnetoresistive effect type magnetic head comprising:

a magnetoresistive effect film;

a soft adjacent layer for applying a transversal bias magnetic field to said magnetoresistive effect film, and opposing said magnetoresistive effect film;

a non-magnetic film interposing between said magnetoresistive effect film and said soft adjacent layer, said non-magnetic film completely covering a surface of said magnetoresistive effect film facing toward said soft adjacent layer; and an antiferromagnetic film disposed on said magnetoresistive effect film for applying a longitudinal bias magnetic field to said magnetoresistive effect film, a surface area of a region over which said magnetoresistive effect film contacts said antiferromagnetic film being greater than a surface area of an active region of said magnetoresistive effect film over which said magnetoresistive effect film does not contact said antiferromagnetic film, wherein said magnetoresistive effect film includes an end face furthest from said active region that faces away from said active region and contacts said antiferromagnetic film, wherein said end face is a surface of said magnetoresistive effect film which is substantially perpendicular to a face of said magnetoresistive effect film which faces a magnetic medium.

2. A magnetic head according to claim 1, wherein said surface area of said region over which said magnetoresistive effect film contacts said antiferromagnetic film is at least two times said surface area of said active region.

3. A magnetic head according to claim 2, wherein a dimension of said soft adjacent layer in a longitudinal bias direction is no greater than 8 times a dimension of said active region in said longitudinal bias direction.

4. A magnetic head according to claim 1, wherein said magnetoresistive effect film has curved corners.

5. A magnetic head according to claim 1, wherein a dimension of said soft adjacent layer in a longitudinal bias direction is no greater than 8 times a dimension of said active region in said longitudinal bias direction.

6. A method for magnetic recording and playback comprising the step of recording information onto a magnetic recording medium or playing back information from a magnetic recording medium using a magnetoresistive effect type magnetic head opposing said magnetic recording medium, said magnetoresistive effect type magnetic head comprising:

a magnetoresistive effect film;

a soft adjacent layer for applying a transversal bias magnetic field to said magnetoresistive effect film, and opposing said magnetoresistive effect film;

a non-magnetic film interposing between said magnetoresistive effect film and said soft adjacent layer, said non-magnetic film completely covering a surface of said magnetoresistive effect film facing toward said soft adjacent layer; and an antiferromagnetic film disposed on said magnetoresistive effect film for applying a longitudinal bias magnetic field to said magnetoresistive effect film, a surface area of a region over which said magnetoresistive effect film contacts said antiferromagnetic film being greater than a surface area of an active region of said magnetoresistive effect film over which said magnetoresistive effect film does not contact said antiferromagnetic film, wherein said magnetoresistive effect film includes an end face furthest from said active region that faces away from said active region and contacts said antiferromagnetic film, wherein said end face is a surface of said magnetoresistive effect film which is substantially perpendicular to a face of said magnetoresistive effect film which faces a magnetic medium.

7. A magnetic recording and playback method according to claim 6, wherein said surface area of said region over which said magnetoresistive effect film contacts said antiferromagnetic film is at least two times said surface area of said active region.

8. A magnetic recording and playback method according to claim 7, wherein a dimension of said soft adjacent layer in a longitudinal bias direction is no greater than 8 times a dimension of said active region in said longitudinal bias direction.

9. A magnetic recording and playback method according to claim 6, wherein said magnetoresistive effect film has curved corners.

10. A magnetic recording and playback method according to claim 6, wherein a dimension of said soft adjacent layer in a longitudinal bias dimension is no greater than 8 times a dimension of said active region in said longitudinal bias direction.

* * * * *